United States Patent
Fujiwara et al.

(10) Patent No.: US 11,020,820 B2
(45) Date of Patent: Jun. 1, 2021

(54) LASER WELDING METHOD

(71) Applicant: Panasonic Intellectual Property Management Co., Ltd., Osaka (JP)

(72) Inventors: Junji Fujiwara, Osaka (JP); Atsuhiro Kawamoto, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 453 days.

(21) Appl. No.: 15/300,313

(22) PCT Filed: Apr. 8, 2015

(86) PCT No.: PCT/JP2015/001984
§ 371 (c)(1),
(2) Date: Sep. 29, 2016

(87) PCT Pub. No.: WO2015/159514
PCT Pub. Date: Oct. 22, 2015

(65) Prior Publication Data
US 2017/0144249 A1     May 25, 2017

(30) Foreign Application Priority Data
Apr. 15, 2014   (JP) .............................. JP2014-083279

(51) Int. Cl.
*B23K 26/02*       (2014.01)
*B23K 26/60*       (2014.01)
(Continued)

(52) U.S. Cl.
CPC .......... *B23K 26/02* (2013.01); *B23K 26/0884* (2013.01); *B23K 26/211* (2015.10);
(Continued)

(58) Field of Classification Search
CPC .............. B23K 26/0884; B23K 33/004; B23K 26/242; B23K 26/60; B23K 26/02; B23K 26/211; B23K 2101/006
(Continued)

(56) References Cited

U.S. PATENT DOCUMENTS 4,857,697 A * 8/1989 Melville ............ B23K 26/0613
                                                    219/121.63
4,960,973 A * 10/1990 Fouche ................. B23K 26/24
                                                    219/121.64
(Continued)

FOREIGN PATENT DOCUMENTS

JP    53-102851    9/1978
JP    54-050450    4/1979
(Continued)

OTHER PUBLICATIONS

International Search Report of PCT application No. PCT/JP2015/001984 dated Jul. 14, 2015.
(Continued)

*Primary Examiner* — Eric S Stapleton
(74) *Attorney, Agent, or Firm* — Wenderoth, Lind & Ponack, L.L.P.

(57) ABSTRACT

A laser welding method of the present disclosure includes a first step and a second step. In the first step, a first end of a first workpiece is positioned such that the first end of the first workpiece is overlapped on a second end of a second workpiece to form a corner joint. In the second step, the first end forming the corner joint is irradiated from above with a laser beam. Additionally, the first end is positioned to protrude relative to the second workpiece in the first step.

5 Claims, 6 Drawing Sheets

(51) Int. Cl.
*B23K 26/08* (2014.01)
*B23K 26/242* (2014.01)
*B23K 26/211* (2014.01)
*B23K 33/00* (2006.01)
*B23K 101/00* (2006.01)

(52) U.S. Cl.
CPC ............ *B23K 26/242* (2015.10); *B23K 26/60* (2015.10); *B23K 33/004* (2013.01); *B23K 2101/006* (2018.08)

(58) Field of Classification Search
USPC .................................................... 219/121.64
See application file for complete search history.

(56) References Cited

U.S. PATENT DOCUMENTS

| | | | | |
|---|---|---|---|---|
| 5,749,511 | A * | 5/1998 | Aebersold | B23K 26/0838 219/121.64 |
| 5,798,867 | A * | 8/1998 | Uchida | B23K 26/067 359/618 |
| 5,879,416 | A | 3/1999 | Nakamura et al. | |
| 6,617,537 | B1 * | 9/2003 | Chiu | A63B 53/04 219/121.14 |
| 6,627,348 | B1 * | 9/2003 | Haraguchi | H01M 2/0426 429/171 |
| 6,989,506 | B2 * | 1/2006 | Yabu | A63B 53/04 219/121.64 |
| 7,034,247 | B2 * | 4/2006 | Wildmann | B23K 26/24 219/121.63 |
| 7,211,763 | B2 * | 5/2007 | Zhang | G02B 6/032 219/121.64 |
| 7,762,909 | B2 * | 7/2010 | Sugimoto | A63B 53/0466 473/346 |
| 7,785,213 | B2 * | 8/2010 | Matsunaga | A63B 53/047 473/342 |
| 8,042,253 | B2 * | 10/2011 | Su | A63B 53/0466 219/121.64 |
| 8,304,689 | B2 * | 11/2012 | Schmid | B23K 37/0294 219/121.63 |
| 8,353,785 | B2 * | 1/2013 | Ines | A63B 53/047 473/342 |
| 8,758,153 | B2 * | 6/2014 | Sargent | A63B 53/02 473/246 |
| 8,884,182 | B2 * | 11/2014 | Lee | B22F 3/1055 219/121.6 |
| 2001/0039217 | A1 * | 11/2001 | Takeda | A63B 53/04 473/324 |
| 2003/0157404 | A1 * | 8/2003 | Inoue | H01M 2/0439 429/175 |
| 2004/0020970 | A1 * | 2/2004 | Palm | B23K 20/1235 228/112.1 |
| 2004/0045943 | A1 * | 3/2004 | Yabu | A63B 53/04 219/121.64 |
| 2004/0074882 | A1 * | 4/2004 | Speranza | B64C 33/02 219/121.64 |
| 2005/0115942 | A1 * | 6/2005 | Stevenson | B23K 9/0203 219/137 R |
| 2005/0237019 | A1 * | 10/2005 | Neumann | B23K 26/046 318/570 |
| 2005/0242067 | A1 * | 11/2005 | Bernhardt | B23K 15/00 219/121.14 |
| 2007/0084551 | A1 * | 4/2007 | Watanabe | B29C 66/8161 156/272.8 |
| 2008/0118825 | A1 * | 5/2008 | Yoon | H01M 2/0404 429/122 |
| 2008/0223831 | A1 * | 9/2008 | Yoshikawa | B23K 26/073 219/121.63 |
| 2009/0233168 | A1 * | 9/2009 | Yoshida | H01M 2/08 429/185 |
| 2009/0314823 | A1 * | 12/2009 | Bray | B23K 20/1205 228/112.1 |
| 2010/0206857 | A1 * | 8/2010 | Bea | B23K 26/0734 219/121.64 |
| 2010/0258538 | A1 | 10/2010 | Suzuki et al. | |
| 2011/0278266 | A1 * | 11/2011 | Kobayashi | B23K 26/244 219/121.64 |
| 2011/0297658 | A1 * | 12/2011 | Peters | B23K 9/02 219/162 |
| 2011/0298160 | A1 * | 12/2011 | Zaitsu | B29C 65/1616 264/497 |
| 2013/0224536 | A1 * | 8/2013 | Hattori | H01M 2/30 429/61 |
| 2013/0270981 | A1 * | 10/2013 | Shishido | H05K 13/00 312/223.1 |
| 2013/0302545 | A1 * | 11/2013 | Schnelker | B23K 33/006 428/34.1 |
| 2014/0034621 | A1 * | 2/2014 | Daniel | B23K 26/24 219/121.64 |
| 2014/0034622 | A1 * | 2/2014 | Barrett | B23K 26/24 219/121.64 |
| 2014/0144893 | A1 * | 5/2014 | Yang | B23K 9/0026 219/121.64 |
| 2014/0352835 | A1 * | 12/2014 | Lin | B23K 9/0052 138/177 |
| 2014/0374391 | A1 * | 12/2014 | Cole | B23K 9/095 219/121.45 |
| 2015/0024260 | A1 * | 1/2015 | Kwak | H01M 2/02 429/178 |
| 2015/0076129 | A1 * | 3/2015 | Spear | B23K 9/067 219/130.51 |
| 2015/0200386 | A1 * | 7/2015 | Harayama | H01M 2/0217 429/185 |
| 2015/0318517 | A1 * | 11/2015 | Suzuki | H01M 2/0217 429/185 |

FOREIGN PATENT DOCUMENTS

| | | |
|---|---|---|
| JP | 5-087539 | 4/1993 |
| JP | 7-116875 | 5/1995 |
| JP | 8-066783 | 3/1996 |
| JP | 8-257773 | 10/1996 |
| JP | 8-315790 | 11/1996 |
| JP | 2000-133211 | 5/2000 |
| JP | 2000-167678 | 6/2000 |
| JP | 2003-136262 | 5/2003 |
| JP | 2004-097550 | 4/2004 |
| JP | 2006-019089 | 1/2006 |
| JP | 2006-289437 | 10/2006 |
| JP | 2009-146645 | 7/2009 |
| JP | 2011-129266 | 6/2011 |
| JP | 2012-148304 | 8/2012 |
| JP | 2013-182724 | 9/2013 |
| JP | 2013-220462 | 10/2013 |
| JP | 2013-237102 | 11/2013 |
| JP | 2014-004632 | 1/2014 |
| JP | 2014-010897 | 1/2014 |
| JP | 5417349 | 2/2014 |
| WO | 2014/002600 | 1/2014 |

OTHER PUBLICATIONS

English translation of Chinese Search Report dated May 30, 2017 in corresponding Chinese Application No. 201580019475.8.
Communication pursuant to Article 94(3) EPC dated Aug. 16, 2018 for the related European Patent Application No. 15780092.1.
Indian Examination Report dated Nov. 6, 2019 in Indian Patent Application No. 201647034265.
"Construction and Supervision Manual for Light Steel Structure (Partial English Translation)", Section 10_Welding Procedure Qualification, p. 99, attached in Chinese Office Action dated Jun. 30, 2020 for Chinese Patent Application No. 201580019475.8.

\* cited by examiner

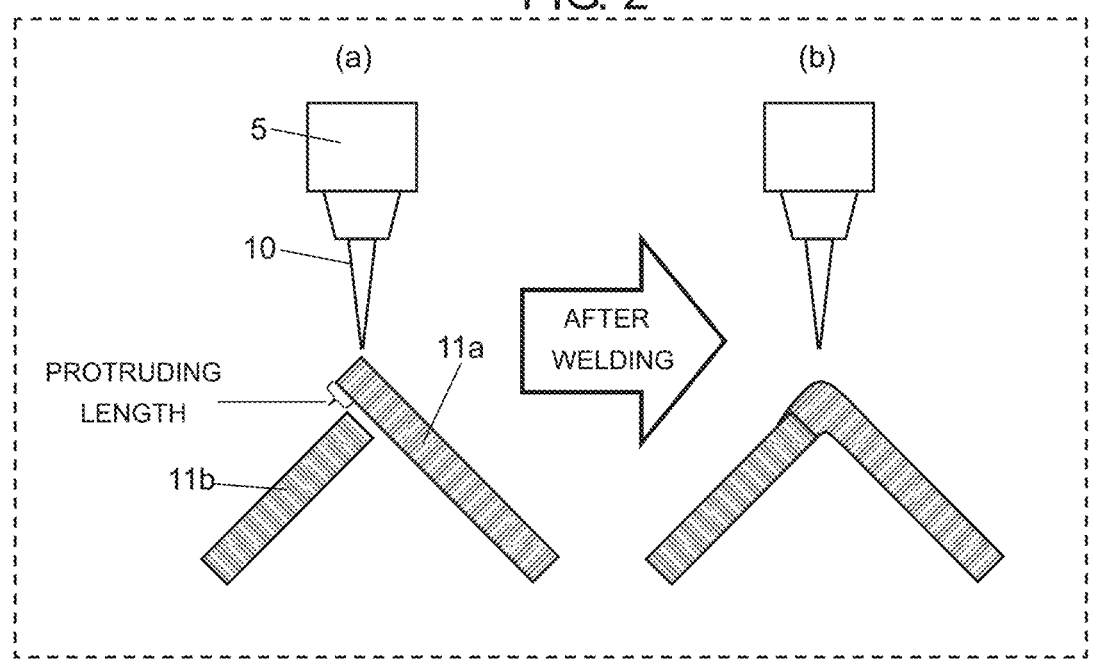
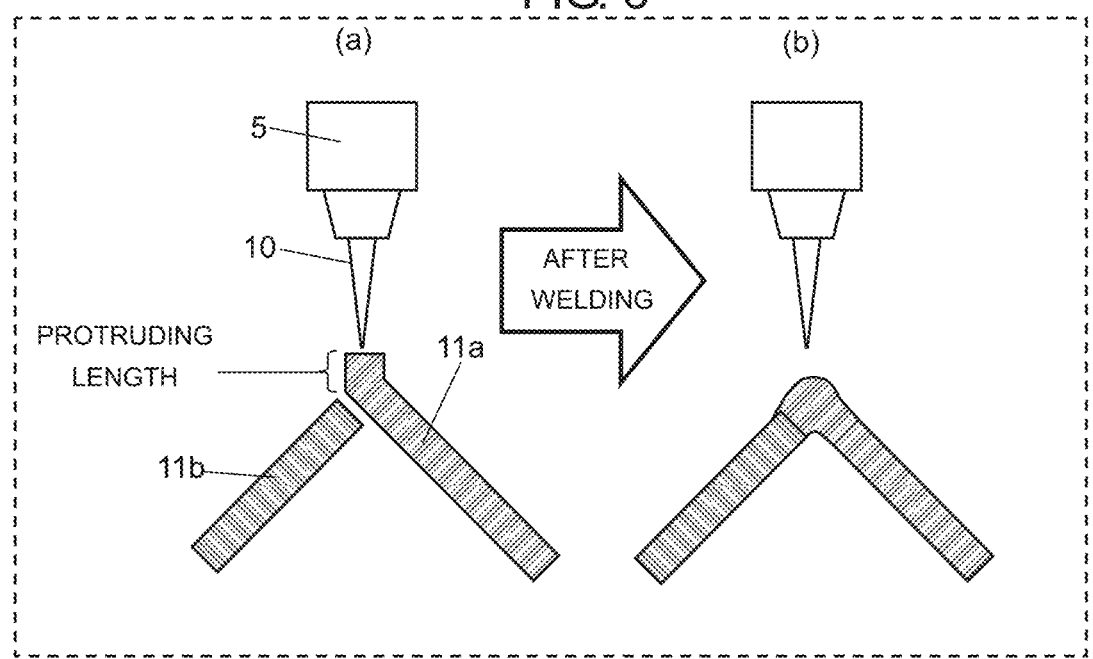

LASER WELDING METHOD

This application is a U.S. national stage application of the PCT international application No. PCT/JP2015/001984.

TECHNICAL FIELD

The present disclosure relates to a laser welding method for welding two workpieces in joint geometry, such as corner joint or edge joint, and more particularly, to a laser welding method usable when there is a gap between two workpieces.

BACKGROUND ART

A weld joint, such as corner joint and edge joint, in which end faces of two workpieces are adjacent to each other is generally welded by electrode-consuming arc welding and is not suitable for laser welding. This is because molten metal to fill a gap between two workpieces is not supplied in the laser welding. While laser welding in which a filler wire is fed can supply molten metal to fill a gap, a filler wire and an apparatus for feeding the filler wire are needed, and the feed position and the amount of a filler wire are required to be controlled. Meanwhile, PTL 1 discloses a laser welding method for welding an edge joint without using a filler wire.

FIG. 11 is a side view illustrating a conventional laser welding method, where (a) is a side view of a workpiece prior to laser welding and (b) is a side view of the workpiece after laser welding. As illustrated in (a) of FIG. 11, lid plate 102 on which plating layer 102a is formed is positioned on substrate 101 on which plating layer 101a is formed. Here, an end of flange 102b of lid plate 102 is positioned to protrude relative to an end of substrate 101. A protruding portion of flange 102b is then laser-welded, and substrate 101 and lid plate 102 are laser-welded as illustrated in (b) of FIG. 11.

CITATION LIST

Patent Literature

PTL1: Unexamined Japanese Patent Publication No. S54-050450

SUMMARY OF THE INVENTION

In a conventional laser welding method, however, the end of upper lid plate 102 and the end of lower substrate 101 are irradiated laterally with a laser beam in an edge joint formed by two overlapped workpieces. This melts the protruding end of lid plate 102 and molten metal sags under gravity, so that the end of lid plate 102 is joined to lower substrate 101. As such, the molten metal cannot sufficiently flow into a gap between substrate 101 and lid plate 102. Thus, substrate 101 and lid plate 102 are not fully joined together.

The present disclosure provides a laser welding method in which molten metal sufficiently flows into a gap between two workpieces providing joint geometry, such as corner joint or edge joint, and thus weld strength can be increased.

In order to solve the above problem, a laser welding method of the present disclosure includes a first step and a second step. In the first step, a first end of a first workpiece is positioned such that the first end of the first workpiece is overlapped on a second end of a second workpiece to form a corner joint. In the second step, the first end forming the corner joint is irradiated from above with a laser beam. Additionally, the first end is positioned to protrude relative to the second workpiece in the first step.

Another laser welding method of the present disclosure includes a first step and a second step. In the first step, a first edge of a first workpiece is positioned such that the first edge of the first workpiece is disposed adjacent to a second edge of a second workpiece to form an edge joint. In the second step, the first edge forming the edge joint is irradiated from above with a laser beam. Additionally, an end of the first edge is positioned to protrude above the second edge in the first step.

As described above, according to the laser welding method of the present disclosure, molten metal sufficiently flows into a gap between two workpieces providing joint geometry, such as corner joint or edge joint, and thus weld strength can be increased.

BRIEF DESCRIPTION OF DRAWINGS

FIG. 2 is a side view illustrating a laser welding method of the first exemplary embodiment, where (a) is a side view of a workpiece prior to laser welding and (b) is a side view of the workpiece after laser welding.

FIG. 3 is a side view illustrating a laser welding method according to modification 1 of the first exemplary embodiment, where (a) is a side view of a workpiece prior to laser welding and (b) is a side view of the workpiece after laser welding.

DESCRIPTION OF EMBODIMENT

First Exemplary Embodiment

Figure 1:
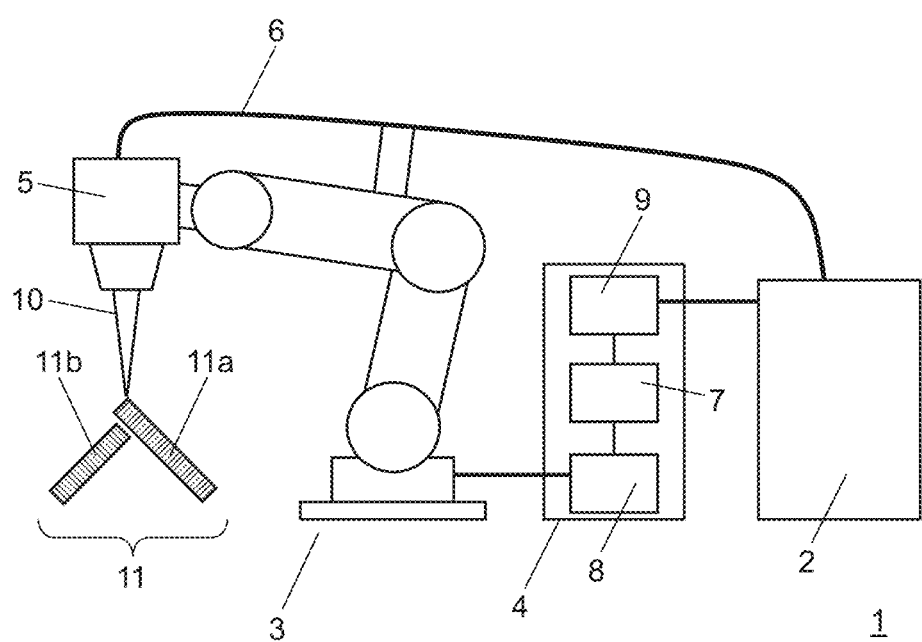
FIG. 1 is a view illustrating a schematic configuration of a laser welding apparatus according to a first exemplary embodiment.
Figure 4:
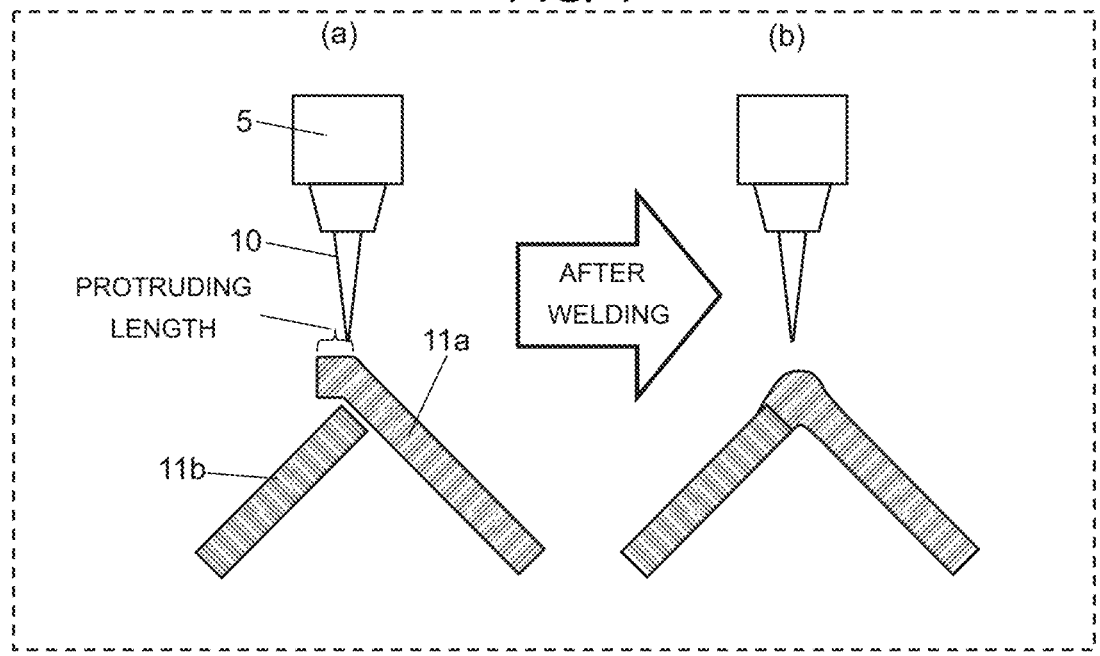
FIG. 4 is a side view illustrating a laser welding method according to modification 2 of the first exemplary embodiment, where (a) is a side view of a workpiece prior to laser welding and (b) is a side view of the workpiece after laser welding.
Figure 5:
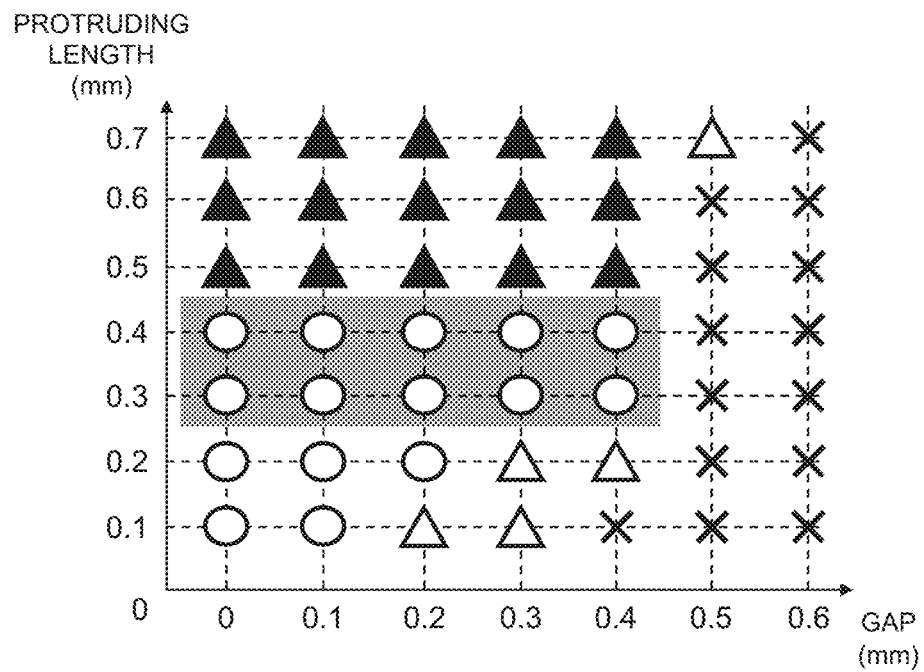
FIG. 5 is a plot of gap versus coverage of a protruding length in the laser welding method of the first exemplary embodiment.
Figure 6:
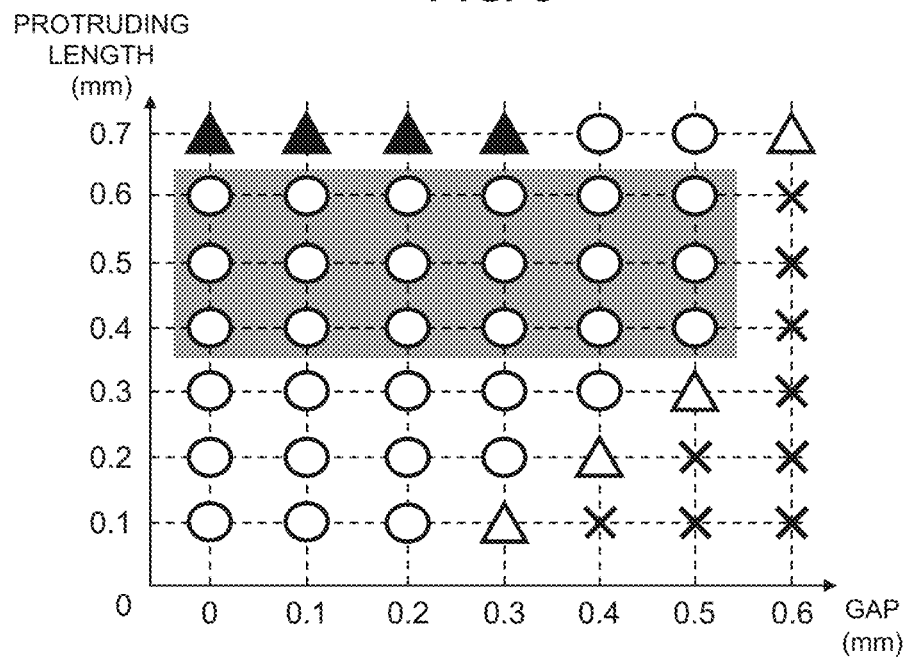
FIG. 6 is a plot of gap versus coverage of a protruding length in the laser welding method of the first exemplary embodiment.

A first exemplary embodiment of the present disclosure is described with reference to FIGS. 1 through 6. FIG. 1 is a view illustrating a schematic configuration of laser welding apparatus 1 according to the present exemplary embodiment. FIG. 2 is a side view illustrating a laser welding method of the present exemplary embodiment, where (a) is a side view of workpiece 11 prior to laser welding and (b) is a side view of workpiece 11 after laser welding. FIG. 3 is a side view illustrating a laser welding method according to modification 1 of the present exemplary embodiment, where (a) is a side view of workpiece 11 prior to laser welding and (b) is a side view of workpiece 11 after laser welding. FIG. 4 is a side view illustrating a laser welding method according to modification 2 of the present exemplary embodiment, where (a) is a side view of workpiece 11 prior to laser welding and (b) is a side view of workpiece 11 after laser welding. FIG. 5 and FIG. 6 are plots of gap versus coverage of a protruding length in the laser welding method of the present exemplary embodiment.

As illustrated in FIG. 1, laser welding apparatus 1 includes laser oscillator 2, robot 3, robot controller 4, laser irradiation head 5, and transmission fiber 6. Also, robot controller 4 includes welding condition setting unit 7, robot controller 8, and laser output controller 9. Robot controller 4 controls laser oscillation of laser oscillator 2, operation of robot 3, operation of laser irradiation head 5, and the like.

Laser oscillator 2 injects output laser light into transmission fiber 6. Transmission fiber 6 directs incident laser light to laser irradiation head 5. Laser irradiation head 5 irradiates workpiece 11 with laser beam 10 directed through transmission fiber 6. In the present exemplary embodiment, workpiece 11a and workpiece 11b to be joined together are collectively referred to as workpiece 11.

Laser irradiation head 5 receives laser beam 10 having a beam diameter depending on laser oscillator 2 and transmission fiber 6. Laser irradiation head 5 is attached to the end of robot 3 and is moved by the operation of robot 3. In one example, laser irradiation head 5 uses a galvanomirror.

Robot controller 4 includes welding condition setting unit 7, robot controller 8, and laser output controller 9. Welding condition setting unit 7 is to set laser welding conditions and provides commands to other components. Robot controller 8 controls, in response to a command from welding condition setting unit 7, the operations of robot 3 and laser irradiation head 5 based on laser welding conditions set in welding condition setting unit 7, pre-taught operation programs, and the like. Laser output controller 9 controls the laser output of laser oscillator 2 based on the laser welding conditions set in welding condition setting unit 7.

Laser welding apparatus 1 irradiates a joint portion of workpiece 11a and workpiece 11b with laser beam 10 focused by a condenser lens (not shown) in laser irradiation head 5, thus performing laser welding. In the present exemplary embodiment, workpiece 11a and workpiece 11b are made of the same material, e.g., a galvanized steel sheet.

The laser welding method of the present exemplary embodiment will now be described with reference to FIGS. 2 through 5. The joint geometry of workpiece 11 is a corner joint in the present exemplary embodiment.

As illustrated in (a) of FIG. 2, an end (first end) of workpiece 11a (first workpiece) is initially positioned such that the end (first end) of workpiece 11a (first workpiece) is overlapped on an end (second end) of workpiece 11b (second workpiece) to form a corner joint. In this case, the end of workpiece 11a is positioned to protrude relative to workpiece 11b. Specifically, the end of workpiece 11a is positioned to be located further above the extension of the upper surface of workpiece 11b. Here, a protruding length is a length from the extension of the upper surface of workpiece 11b to an end face of workpiece 11a; a protruding volume is a volume of a portion within the end of workpiece 11a and protruding relative to the extension of the upper surface of workpiece 11b.

Laser irradiation head 5 then irradiates the end of workpiece 11a with laser beam 10 from above to melt the end of workpiece 11a, and thus workpiece 11a and workpiece 11b are joined together by corner joint as illustrated in (b) of FIG. 2. The end of workpiece 11b is also melted by laser beam 10 and heat of molten workpiece 11a. Assuming a direction in which workpiece 11a extends from the corner joint is a reference direction (0 degrees), workpiece 11b extends in a direction 90 degrees clockwise from the reference direction. Workpiece 11a is irradiated with laser beam 10 in a direction 225 degrees clockwise (i.e., a direction 135 degrees counterclockwise) from the reference direction.

The melting mechanism is more specifically described. When the end of workpiece 11a is irradiated with laser beam 10, the end of workpiece 11a melts, the molten metal sags under its own weight, thereby filling a gap between workpiece 11a and workpiece 11b. This allows for appropriate laser welding connection without piercing at the welding location of the corner joint even if there is a gap between workpiece 11a and workpiece 11b. The protruding volume by which an end portion of workpiece 11a protrudes relative to the extension of the upper surface of workpiece 11b is preferably a volume capable of filling the gap between workpiece 11a and workpiece 11b. That is, the protruding volume by which the end portion of workpiece 11a protrudes relative to the extension of the upper surface of workpiece 11b is preferably larger than the volume of the gap. However, since part of workpiece 11a located below the extension of the upper surface of workpiece 11b melts, the protruding volume need not necessarily be larger than the volume of the gap.

In the present exemplary embodiment, as illustrated in (a) and (b) of FIG. 2, the irradiation direction of laser beam 10 is vertically downward, and workpiece 11a and workpiece 11b are positioned such that workpiece 11a extends from the corner joint in a lower right direction by about 45 degrees and workpiece 11b extends from the corner joint in a lower left direction by about 45 degrees. That is, workpiece 11a and workpiece 11b are disposed symmetrically. The arrangement is not limited to the above, and the workpieces may be tilted clockwise a little bit so that the protruding portion of workpiece 11a is located vertically upward of the gap. In other words, workpiece 11a and workpiece 11b may be positioned such that workpiece 11a extends from the corner joint further in a vertically downward direction compared to a lower right direction of about 45 degrees and workpiece 11b extends from the corner joint further in a left direction compared to a lower left direction of about 45 degrees. This allows the protruding portion of workpiece 11a to be located more directly above the gap and facilitates molten metal flow into the gap. Conversely, the workpieces may be tilted counterclockwise a little bit so that the protruding portion of workpiece 11a is located on the left side above the gap. In other words, workpiece 11a and workpiece 11b may be positioned such that workpiece 11a extends from the corner joint further in a right direction compared to a lower right direction of about 45 degrees and workpiece 11b extends from the corner joint further in a vertically downward direction compared to a lower left direction of about 45 degrees. This allows the molten metal in the protruding portion of workpiece 11a to make reliable contact with workpiece 11b even if the gap is large.

Modification 1

Here, (a) of FIG. 3 illustrates a state prior to laser welding in which the end of workpiece 11a illustrated in (a) of FIG. 2 is bent upward, that is, vertically upward as opposed to vertically downward being the irradiation direction of laser beam 10. Such a configuration allows the protruding portion of workpiece 11a to be located more directly above the gap and facilitates molten metal flow into the gap. As illustrated in (b) of FIG. 3, as with (b) of FIG. 2, when the protruding end of workpiece 11a is irradiated with laser beam 10, the protruding end of workpiece 11a melts and the molten metal sags under its own weight, thereby filling a gap between workpiece 11a and workpiece 11b. This allows for appropriate laser welding connection without piercing at the welding location of the corner joint even if there is a gap between workpiece 11a and workpiece 11b.

Modification 2

Here, (a) of FIG. 4 illustrates a state prior to laser welding in which the end of workpiece 11a illustrated in (a) of FIG. 2 is bent to the left, i.e., toward workpiece 11b. Such a configuration allows the molten metal in the protruding portion of workpiece 11a to make reliable contact with workpiece 11b even if the gap is large. As illustrated in (b) of FIG. 4, as with (b) of FIG. 2, when the protruding end of workpiece 11a is irradiated with laser beam 10, the protruding end of workpiece 11a melts and the molten metal sags under its own weight, thereby filling a gap between workpiece 11a and workpiece 11b. This allows for appropriate laser welding connection without piercing at the welding location of the corner joint even if there is a gap between workpiece 11a and workpiece 11b.

Verification of the Results of Laser Welding Method

Good welding described above requires appropriate welding conditions. Such an example is described below.

In the laser welding illustrated in (a) and (b) of FIG. 2, FIG. 5 and FIG. 6 show the coverage of the protruding length of the end portion of workpiece 11a protruding relative to the extension of the upper surface of workpiece 11b with respect to the gap between workpiece 11a and workpiece 11b. FIG. 5 shows a case where the thicknesses t of workpiece 11a and workpiece 11b are 0.8 mm. FIG. 6 shows a case where the thicknesses t of workpiece 11a and workpiece 11b are 1.2 mm.

In FIG. 5 and FIG. 6, the abscissa represents a gap length between workpiece 11a and workpiece 11b, and the ordinate represents the protruding length of the end portion of workpiece 11a protruding relative to the extension of the upper surface of workpiece 11b. The results of laser welding obtained under various conditions are indicated by circle (○), black triangle (▲), white triangle (Δ), and cross (x). Here, the circle (○) indicates good bead, black triangle (▲) indicates convex bead, white triangle (Δ) indicates partial piercing, and cross (x) indicates entire piercing.

As shown in FIG. 5, good results (○) can be obtained when the protruding length is 0.3 mm to 0.4 mm and the gap is 0 mm to 0.4 mm. When the protruding length is 0.1 mm to 0.2 mm, the amount of molten metal to fill the gap is insufficient, so that a large gap causes partial piercing (Δ) or piercing (x). When the protruding length is 0.5 mm to 0.7 mm, the amount of molten metal is too much for a small gap so that the convex bead (▲) is created and bead appearance is poor, while a large gap causes partial piercing (z) or piercing (x).

As shown in FIG. 6, good results (○) can be obtained when the protruding length is 0.4 mm to 0.6 mm and the gap is 0 mm to 0.5 mm. When the protruding length is 0.1 mm to 0.3 mm, the amount of molten metal to fill the gap is insufficient, so that partial piercing (Δ) or piercing (x) occurs. When the protruding length is greater than or equal to 0.7 mm, the amount of molten metal is too much for a small gap so that the convex bead (▲) is created and bead appearance is poor, while a large gap causes partial piercing (Δ).

FIG. 5 and FIG. 6 show that a protruding length of ⅓ to ½ the thickness of a workpiece to be protruded (i.e., workpiece 11a in the present exemplary embodiment) can accommodate a wide range of gaps.

Second Exemplary Embodiment

Figure 7:
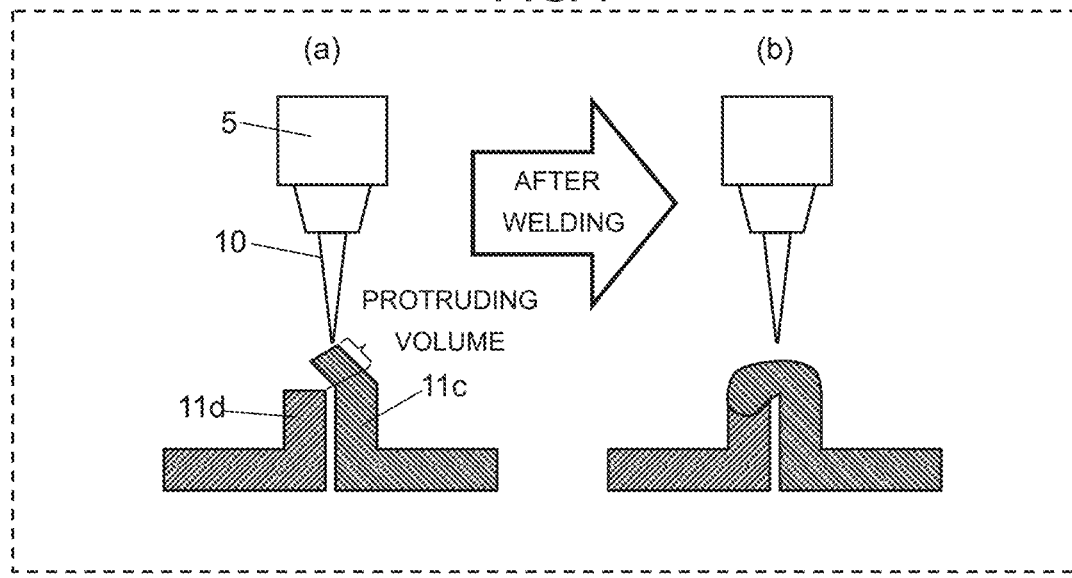
FIG. 7 is a side view illustrating a laser welding method according to a second exemplary embodiment, where (a) is a side view of a workpiece prior to laser welding and (b) is a side view of the workpiece after laser welding.
Figure 8:
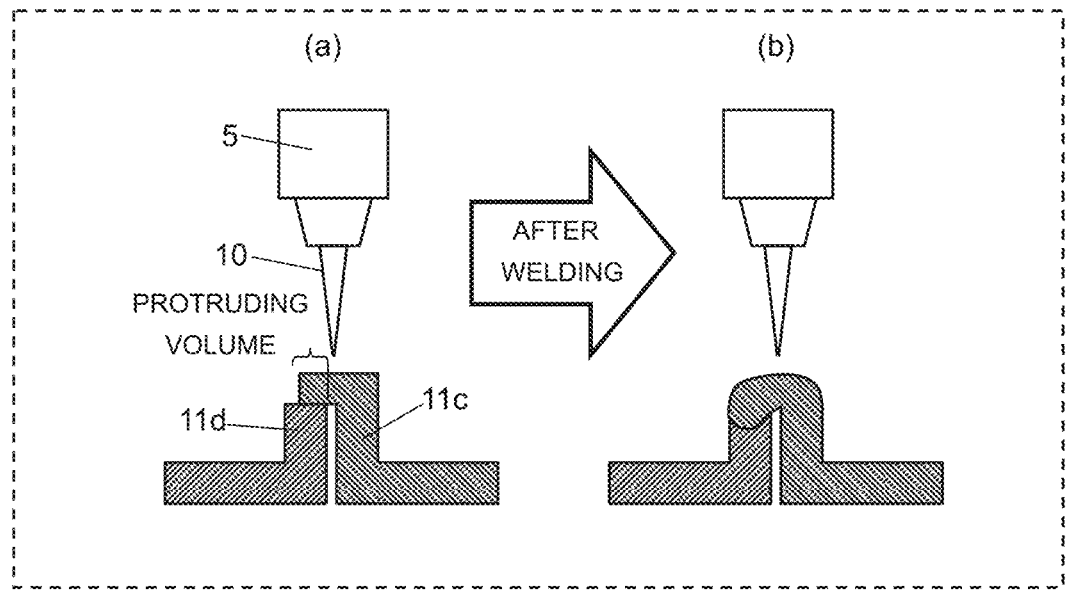
FIG. 8 is a side view illustrating a laser welding method according to a modification of the second exemplary embodiment, where (a) is a side view of a workpiece prior to laser welding and (b) is a side view of the workpiece after laser welding.

A laser welding method according to a second exemplary embodiment will now be described with reference to FIG. 7 and FIG. 8. FIG. 7 is a side view illustrating a laser welding method of the present exemplary embodiment, where (a) is a side view of workpiece 11 prior to laser welding and (b) is a side view of workpiece 11 after laser welding. FIG. 8 is a side view illustrating a laser welding method according to a modification of the present exemplary embodiment, where (a) is a side view of workpiece 11 prior to laser welding and (b) is a side view of workpiece 11 after laser welding. Laser welding apparatus 1 illustrated in FIG. 1 and in the first exemplary embodiment is also used in the present exemplary embodiment, where the joint geometry of workpiece 11 is an edge joint.

As illustrated in (a) of FIG. 7, an edge (first edge) of workpiece 11c (first workpiece) is initially positioned such that the edge (first edge) of workpiece 11c (first workpiece) is disposed adjacent to an edge (second edge) of workpiece 11d (second workpiece) to form an edge joint. An end of the edge of workpiece 11c is bent at about 45 degrees toward workpiece 11d. The end of the edge of workpiece 11c is positioned to protrude above the edge of workpiece 11d. Specifically, the end of the edge of workpiece 11c is positioned to be located further toward workpiece 11d relative to the extension of the side of the edge of workpiece 11d. Here, a protruding length is a length from the extension of the side of the edge of workpiece 11d to an end face of the edge of workpiece 11c; a protruding volume is a volume of a portion within the end of the edge of workpiece 11c and protruding relative to the extension of the side of workpiece 11d.

Laser irradiation head 5 then irradiates the end of the edge of workpiece 11c with laser beam 10 from above to melt the end of the edge of workpiece 11c, and thus workpiece 11c and workpiece 11d are joined together by edge joint as illustrated in (b) of FIG. 7. The edge of workpiece 11d is also melted by laser beam 10 and heat at the molten end of the edge of workpiece 11c.

As with the first exemplary embodiment, when the end of the edge of workpiece 11c is irradiated with laser beam 10, the end of the edge of workpiece 11c melts, the molten metal sags under its own weight, thereby filling a gap between the edge of workpiece 11c and the edge of workpiece 11c. This allows for appropriate laser welding connection without piercing at the welding location of the edge joint even if there is a gap between the edge of workpiece 11c and the edge of workpiece 11d. The protruding volume by which an end portion of the edge of workpiece 11c protrudes from the extension of the side of the edge of workpiece 11d is preferably a volume capable of filling the gap between the edge of workpiece 11c and the edge of workpiece 11d and obtaining desired strength. That is, the protruding volume by which the end portion of the edge of workpiece 11c protrudes from the extension of the side of the edge of workpiece 11d is preferably larger than the volume of the gap to be filled. However, since part of the edge of workpiece 11c located to the right relative to the extension of the side of the edge of workpiece 11d melts, the protruding volume need not necessarily be larger than the volume of the gap to be filled.

In the laser welding illustrated in (a) and (b) of FIG. 7, workpiece 11c and workpiece 11d are placed on a surface (horizontal plane) perpendicular to the irradiation direction of laser beam 10 that is vertically downward. The placement is not limited to the above, and workpiece 11c and workpiece 11d may be tilted to the left or right. That is, workpiece 11c and workpiece 11d may be tilted down to the right so that workpiece 11d is raised. This allows the protruding portion of workpiece 11c to be located more directly above the gap and facilitates molten metal flow into the gap. Conversely, workpiece 11c and workpiece 11d may be tilted down to the left so that workpiece 11d is lowered. This allows the molten metal in the protruding portion of the edge of workpiece 11c to make reliable contact with the edge of workpiece 11d even if the gap is large.

The bending angle at the end of the edge of workpiece 11c is not limited to 45 degrees and may be greater than or equal to 30 degrees at which the molten metal can sag under its own weight. The upper limit of the bending angle may be 90 degrees.

Modification

Here, (a) of FIG. 8 illustrates a state prior to laser welding in which the end of the edge of workpiece 11c illustrated in (a) of FIG. 7 is bent 90 degrees toward the edge of the workpiece 11d. Such a configuration allows the molten metal in the protruding portion of the edge of workpiece 11c to make reliable contact with the edge of workpiece 11d even if the gap is large. As illustrated in (b) of FIG. 8, as with (b) of FIG. 7, when the protruding end of the edge of workpiece 11c is irradiated with laser beam 10, the protruding end of the edge of workpiece 11c melts and the molten metal sags under its own weight, thereby filling a gap between the edge of workpiece 11c and the edge of workpiece 11d. This allows for appropriate laser welding connection without piercing at the welding location of the edge joint even if there is a gap between the edge of workpiece 11c and the edge of workpiece 11d.

While the bending angle at the end of the edge of workpiece 11c is greater than or equal to 30 degrees and less than or equal to 90 degrees in the above description, the most stable and suitable laser welding can be performed at an angle of 90 degrees, as in the case of the modification.

A total length of a gap length between the edge of workpiece 11c and the edge of workpiece 11d and a thickness of the edge of workpiece 11d is suitable for the protruding length by which the end portion of the edge of workpiece 11c protrudes relative to the extension of the side of the edge of workpiece 11d.

Bending the end of the edge of workpiece 11c can accommodate the gap between the edge of workpiece 11c and the edge of workpiece 11d, where the larger the gap, the higher the effectiveness.

Figure 9:
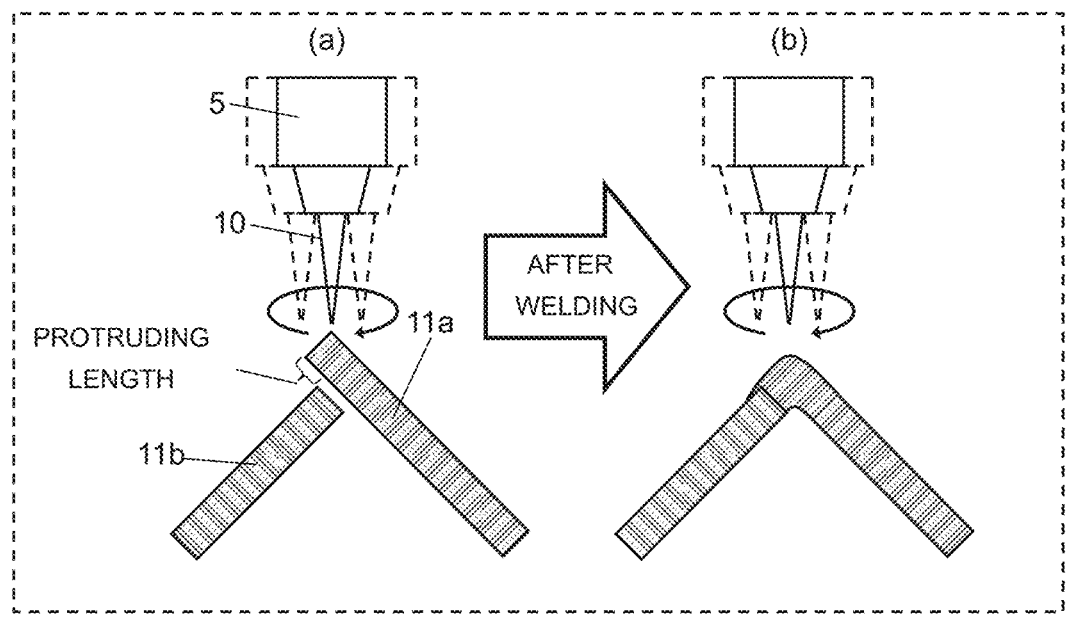
FIG. 9 is a side view illustrating a laser welding method of the present disclosure in which laser beam 10 is wobbled (weaved), (a) is a side view of a workpiece prior to laser welding and (b) is a side view of the workpiece after laser welding.
Figure 10:
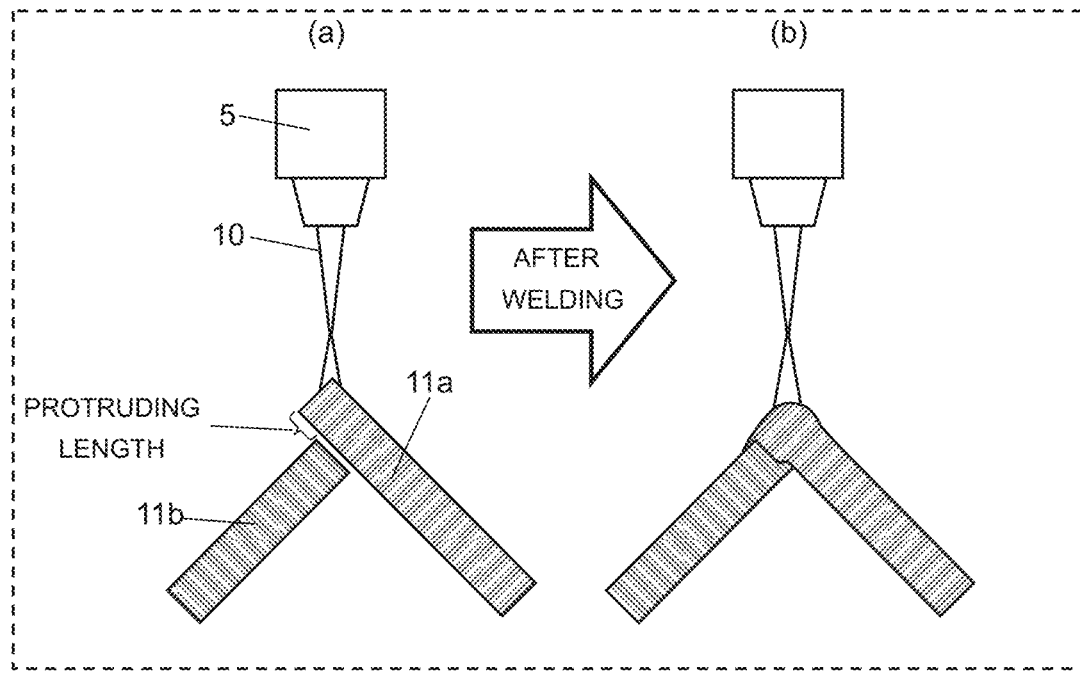
FIG. 10 is a side view illustrating a laser welding method of the present disclosure in which laser beam 10 is defocused, where (a) is a side view of a workpiece prior to laser welding and (b) is a side view of the workpiece after laser welding.
Figure 11:
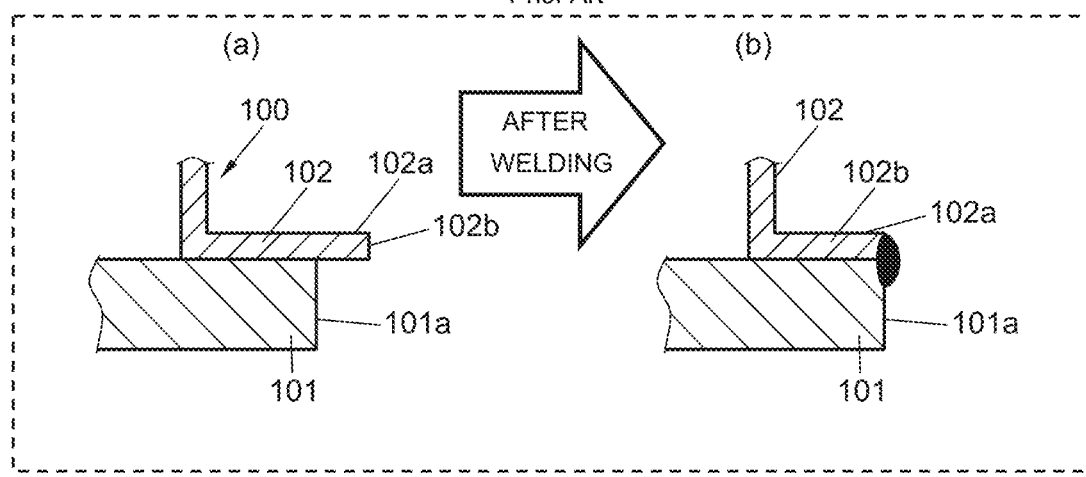
FIG. 11 is a side view illustrating a conventional laser welding method, where (a) is a side view of a workpiece prior to laser welding and (b) is a side view of the workpiece after laser welding.

Additionally, for both the first and second exemplary embodiments, a laser welding method to expand the irradiation range of laser beam 10 is described with reference to FIG. 9 and FIG. 10. FIG. 9 is a side view illustrating a laser welding method of the present disclosure in which laser beam 10 is wobbled (weaved), where (a) is a side view of workpiece 11 prior to laser welding and (b) is a side view of workpiece 11 after laser welding. FIG. 10 is a side view illustrating a laser welding method of the present disclosure in which laser beam 10 is defocused, where (a) is a side view of workpiece 11 prior to laser welding and (b) is a side view of workpiece 11 after laser welding.

For example, in the case where workpiece 11 is thick or welding tolerance for gap, misalignment, etc. is required in the corner joint of the first exemplary embodiment, laser welding may be performed while wobbling (weaving) laser beam 10 as illustrated in (a) and (b) of FIG. 9. Alternatively, laser welding may be performed by defocusing laser beam 10 and expanding the diameter of the laser beam as illustrated in (a) and (b) of FIG. 10. Furthermore, laser welding can be performed using both wobbling (weaving) and defocusing. Thus, melting workpiece 11 extensively by expanding the irradiation range of laser beam 10 allows for laser welding with good bead appearance, for example, even in the case where workpiece 11 is thick or welding tolerance for gap, misalignment, etc. is required.

As with the corner joint of the first exemplary embodiment, laser welding with good bead appearance can also be performed for the edge joint of the second exemplary embodiment by expanding the diameter of laser beam 10 using laser beam 10 wobbling (weaving), defocusing, or both laser beam wobbling (weaving) and defocusing.

INDUSTRIAL APPLICABILITY

As described above, the laser welding method of the present disclosure is useful in industry, where molten metal sufficiently flows into a gap between two workpieces providing joint geometry, such as corner joint or edge joint, and thus weld strength can be increased.

The invention claimed is:

1. A laser welding method comprising:
a first step of positioning a first end of a first workpiece such that the first end of the first workpiece overlaps a second end of a second workpiece to form a corner joint, the corner joint being positioned for melting and joining the first end of the first workpiece and the second end of the second workpiece, the corner joint being formed by the first end of the first workpiece extending in a reference direction and the second end of the second workpiece extending in a direction orthogonal to the reference direction, the first workpiece and the second workpiece being disposed so as to be bilaterally symmetrical, the corner joint forming an angle of 90 degrees between the first workpiece and the second workpiece, the angle opening vertically below; and
a second step of melting the first end of the first workpiece by irradiating the first end forming the corner joint with a laser beam from vertically above, and melting the second end of the second workpiece using the laser beam and the heat from the first workpiece in a molten state to join the first workpiece and the second workpiece,
wherein the first end is positioned to protrude relative to the second workpiece in the first step,
wherein (i) an upper surface of the first end is bent vertically upward so that the upper surface of the first end faces an irradiation direction of the laser beam, (ii) the irradiation direction of the laser beam extends in a vertically downward direction relative to the first workpiece, and (iii) the upper surface of the first end extends in a horizontal direction relative to the vertically downward direction of the irradiation direction of the laser beam so that the upper surface of the first end extending in the horizontal direction is perpendicular to the vertically downward direction of the irradiation direction of the laser beam, and wherein, when the first end of the first workpiece is irradiated with the laser beam from vertically above, the first end of the workpiece melts and sags under its own weight in the molten state, thereby filing a gap between the first workpiece and the second workpiece and joining the first workpiece and the second workpiece.

2. The laser welding method according to claim 1, wherein the gap is formed between the first workpiece and the second workpiece in the corner joint, and a volume by which the first end protrudes relative to the second workpiece is larger than a volume of the gap.

3. The laser welding method according to claim 1, wherein a distance by which the first end protrudes relative to the second workpiece can be greater than or equal to one-eight and less than or equal to one-fourth a thickness of the first workpiece when the gap is less than 0.1 mm, and the distance can be greater than or equal to one-sixth and less than or equal to one-fourth the thickness of the first workpiece when the gap is greater than or equal to 0.1 mm and less than or equal to 0.2 mm.

4. The laser welding method according to claim 1, wherein the laser beam is weaved in the second step.

5. The laser welding method according to claim 1, wherein the laser beam is defocused in the second step.

* * * * *